Nov. 20, 1934.   B. KAČER ET AL   1,981,805
DRIVING MECHANISM
Filed Nov. 1, 1933   3 Sheets-Sheet 1

Inventors:

Nov. 20, 1934.   B. KAČER ET AL   1,981,805
DRIVING MECHANISM
Filed Nov. 1, 1933   3 Sheets-Sheet 2

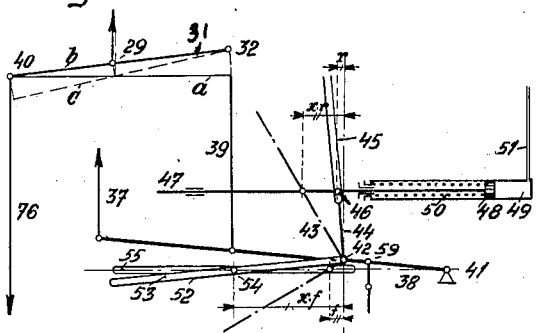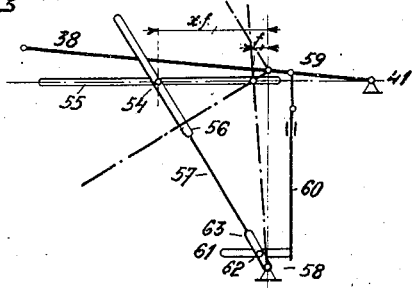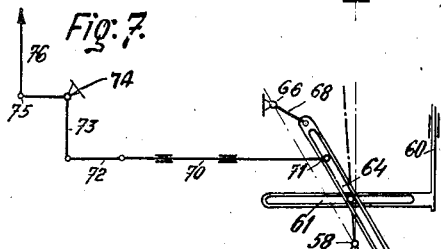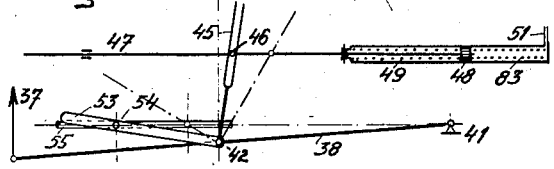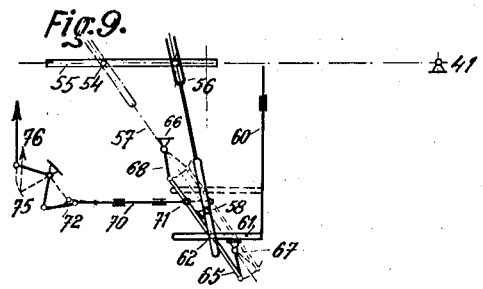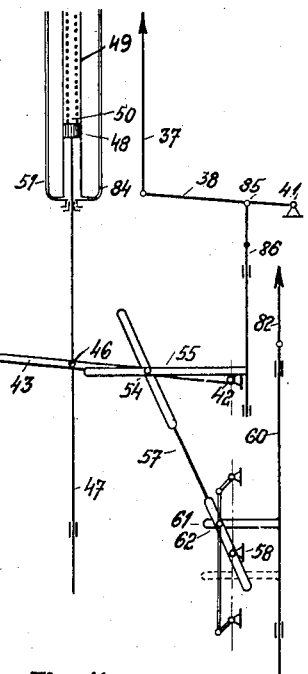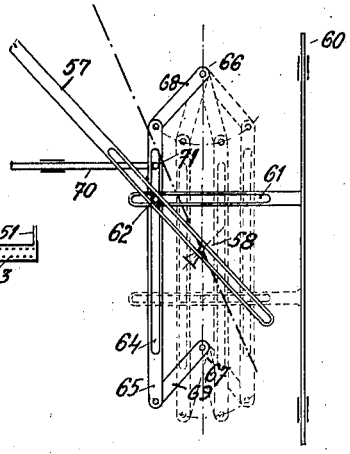

Patented Nov. 20, 1934

1,981,805

UNITED STATES PATENT OFFICE 1,981,805

DRIVING MECHANISM

Bohuslav Kačer and Max Nohel, Prague, Czechoslovakia

Application November 1, 1933, Serial No. 696,287 In Germany December 31, 1932

12 Claims. (Cl. 74—472)

This invention relates to driving mechanism, especially such as is employed for motor vehicles.

The endeavour, to make the control of motor vehicles fool-proof, that is to say, independent of the skill of the driver, leads to constructions in which the operation of the controlling mechanism is effected by means of a single lever, whilst the clutching, the insertion of the speed, etc. are effected by automatic mechanisms which are operated hydraulically or mechanically in dependence upon the speed of the vehicle and engine.

These constructions solve the problem only partially or they employ the usual elements which are subject to wear or a portion of the energy of the driving engine is lost.

It is therefore a question of employing no disengageable toothed wheel gears and no brake parts which are subject to wear, and providing such an arrangement that the correct transmission ratio can be adjusted without loss of power in dependence upon the engine output that is adjusted from the gas lever and upon the ratio between the power momentum of the engine and the load momentum.

The essence of the present invention is characterized by the feature that there is inserted between the shaft that is driven by the engine and the shaft, on which the vehicle wheels are mounted, an adjustable sliding connection which fixes the lagging or the lead of the two shafts.

The adjustable sliding connection consists of the known planet gear, the sun wheel of which is mounted on the shaft of the engine and to the rim of which a pump system of an hydraulic gear is connected for variable speed transmission, the second pump system of which hydraulic gear is mounted on one of the two shafts, and of a regulating member which automatically influences the transmission ratio in the hydraulic gear, that is adjusted from the gas lever, in the proportion of the load momentum to the momentum of the engine (referred to the pins of the satellites of the planet gear), so that the correct transmission ratio is always given to the driving wheels of the motor vehicle.

The invention is developed in the present specification for drives of motor vehicles—i. e., for drives in which both the output of the engine and the load momentum are variable and exert an influence on the transmission ratio to be adjusted. It is, however, obvious that the present construction is applicable to any desired drive with variable working momentum and load momentum.

The invention will be developed and more fully explained below with the aid of a number of examples of embodiment represented in the accompanying drawings.

Figure 2:
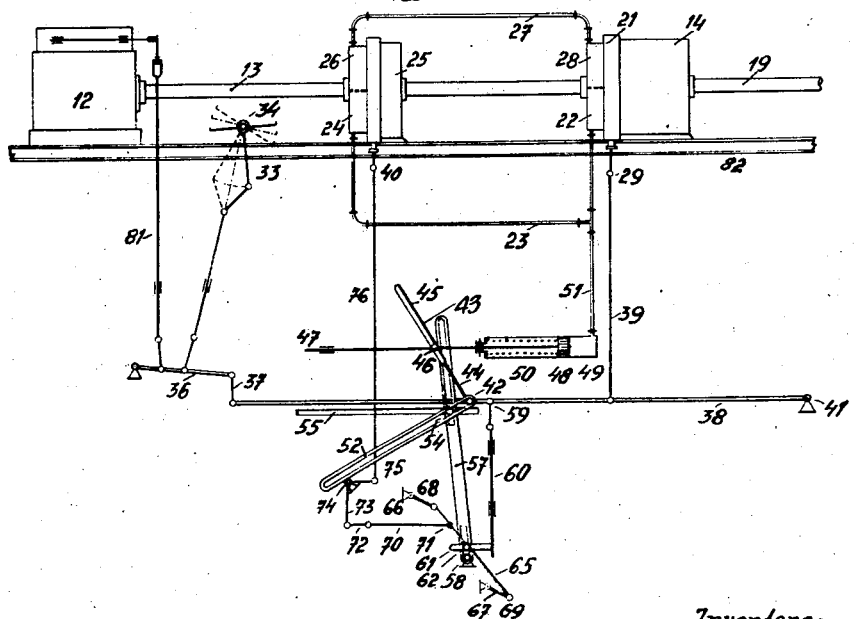
Fig. 2 shows the simplification of the control and regulating rods which simplification is produced when, in contradistinction to Fig. 1, the second pump system is arranged to act directly on the shaft driven by the engine (instead of on the driving shaft). In the case of this arrangement also the delivery volume of the two pump systems is chosen as zero in the running-light position.
Figure 3:
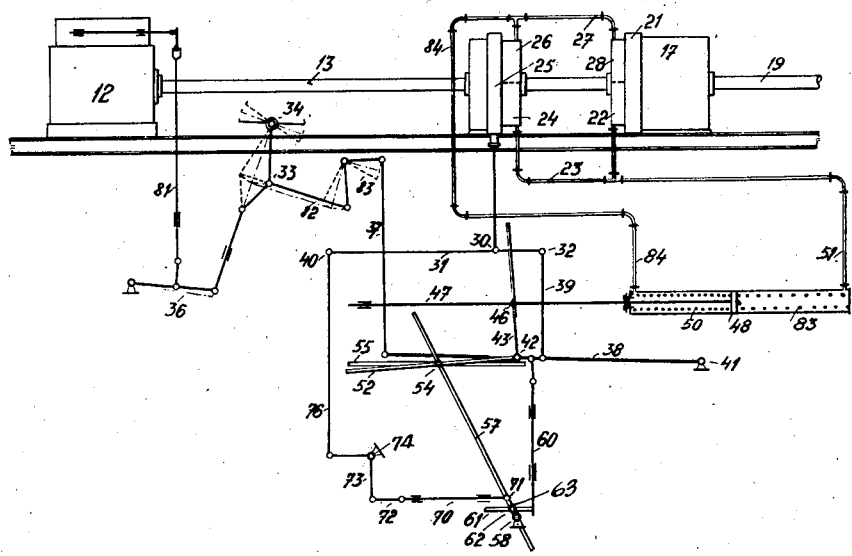

Fig. 3 is developed from the arrangement shown in Fig. 2, the delivery volume of the two pump systems in the idling position of the control rods being so chosen that both systems have the same output. With an invariable delivery volume of the pump system connected to the planetary wheel, the delivery volume of the second pump system can, in comparison with that of the running-light position, be reduced (forward travel) or increased (rearward travel), so that the mechanical reversing gear is superfluous.

Figure 4:
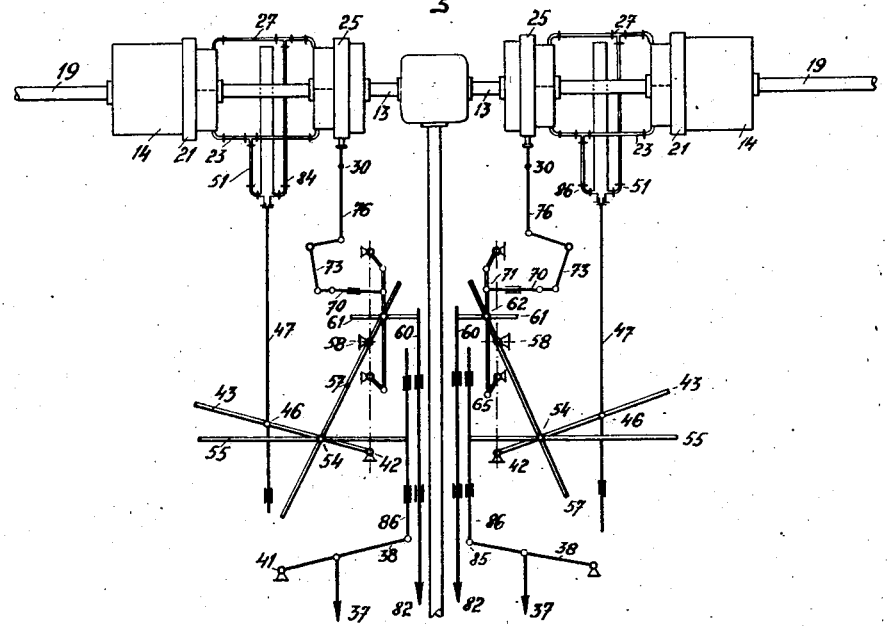

Fig. 4 shows an embodiment in the case of which an arrangement according to Fig. 3 and a different construction of the regulating rods is provided for each driving wheel.

Figs. 5 to 7 show the regulating member, and the regulating rods connected therewith, for the arrangements according to Figs. 1 and 2, Figs. 8 and 9 show the regulating rods for the arrangement according to Fig. 3, and, finally, Figs. 10 and 11 show two different constructions of the parts of the regulating rods for the arrangement according to Fig. 4.

Figure 1:
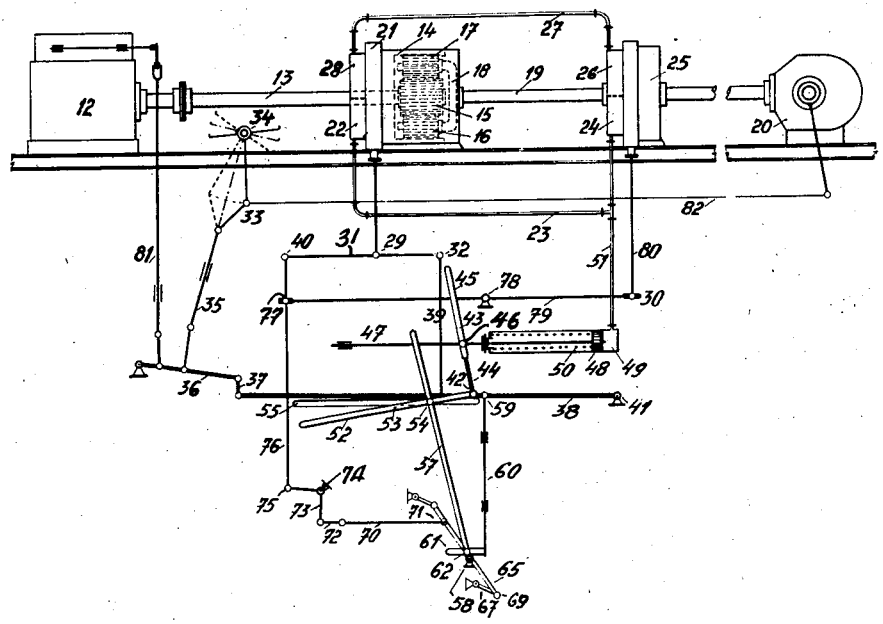
Fig. 1 shows an arrangement in which the pump system, that is connected with the planet rim of the planet gear, is connected with a second pump system, which acts upon the driving shaft that is set in motion through the planet gear, the variable delivery volume of the two pumps being chosen as zero in the idling position of the control rods.

The embodiment represented in Fig. 1 has a driving engine 12 with the shaft 13 driven thereby, on which shaft the planet gear 14 is mounted. The sun wheel 15 of the planet gear is keyed on the shaft 13 and meshes with the satellites 16 which engage, on the other hand, with the planet rim 17 of the planet gear. The satellites 16 are freely rotatable on pins on the arm 18 which is keyed on the shaft 19. From 19, the movement is transmitted to the driving wheels of the automobile through a reversing gear 20 and, if required, through a differential gear.

The planet rim 17 is firmly connected with the pump system 21. From the pressure chamber 22 of this pump system 21, a pipe 23 leads to the admission chamber 24 of a second pump system 25 which operates as an hydraulic motor and acts on the shaft 19. From the discharge chamber 26 of the pump system 25 a pipe 27 leads back to the suction chamber 28 of the first pump system 21.

The magnitude of the delivery volume of the pump system 21 is determined by the position of the point 29 whilst that of the pump system 25 is determined by the position of the point 30. The position of the point 29 is given by the position of the lever 31. Its end point 32 is mechanically adjusted from the point 33 of the control lever 34 through rods and levers 35, 36, 37, 38 and 39 in dependence upon the momentary engine output. The second end point 40 of the lever 31 is shifted automatically. The lever 38, that is rotatably mounted at the point 41 (Fig. 5), carries a pivot 42 about which a right angled bell-crank lever 43 swings. The arm 44 of the bell crank lever embraces, with the slot 45, a pin 46 which is fixed on the straightly guided piston rod 47. The piston rod 48 fixed to the piston rod 47 moves in the cylinder 49. The piston is loaded, on the one hand, with the spring 50 and, on the other hand, with the pressure of the liquid in the pipe 23, from which a branch pipe 51 leads to the cylinder 49.

The second arm 52 of the bell-crank lever 43 embraces with the slot 53 the pin of a slide block 54, which moves in the guide 55 that is firmly mounted in the frame.

The pin of the slide block 54 is further embraced by a slot 56 of the rocking lever 57 (Fig. 6) which rocks about the fixed point 58.

Again, from the point 59 of the lever 38 and through the straightly guided rod 60 the guide 61 is adjusted, in which guide there moves the slide block 62 whose pin engages in the second slot 63 of the lever 57.

The pin of the slide block 62 also engages in the slot 64 of the shackle 65 which is guided parallel to the outer limiting position of the lever 57 by means of the links 68 and 69 that are mounted at 66 and 67 respectively (Fig. 7). The straightly guided rod 70, which, with its pin 71 engages in the slot 64, leads through the link 72 to the bell-crank lever 73, which is rotatably mounted at 74 and, from the second end point 75 of which, the rod 76 shifts the second end point 40 of the lever 31. From the point 77 of the rod 76 (Fig. 1) the movement is transmitted through the lever 79, that is mounted at 78, to the rod 80, which shifts the point 30 and, consequently adjusts the delivery volume of the second pump system 25. From the point 33 of the control lever 34, the reversing gear is operated through the rod 82 in accordance with the particular direction of travel required.

Again, from the lever 36 the rod 81 is operated which regulates the supply of the gas mixture to the engine.

When the driving engine is running light, both the first pump system 21 and the second pump system 25 have a delivery volume equal to zero. The shaft 13 imparts to the sun wheel 15 a certain circumferential velocity $v$, the satellites 16 rotate with the same circumferential velocity about the pins on the arm 18, which remains at rest, and transmits the same circumferential velocity to the planet rim 17 and to the pump system 21 which is connected to the latter and which, at the delivery volume of zero, opposes no resistance to the movement. The control lever 34 and the rods connected thereto are in the middle position.

If one starts with this position and shifts the control lever 34 forward, in the first place a certain engine output is adjusted (by 81) and, in the second place, the lever 31 is, by means of the rod 39 connected to 38, rotated about the point 40, that is stationary at the time being from the middle position $a$ into the position $b$ (Fig. 5) and, consequently, a rate of output of the pump system 21 of the magnitude $s$ is adjusted from the point 29. In the third place, the pin 42 of the bell-crank lever 43 and the rod 60 of the guide 61 are lifted by an amount which is proportional to the adjusted engine output.

By adjusting a rate of output in the first pump system 21, it is stopped in its movement because the second pump system 25, which is included in its delivery circuit, still has at that time the rate of output zero and therefore arrests the rotation of the pump system 21 and the planet rim 17 connected thereto. The result is that the satellites 16 begin to roll along 17 and the arm 18 transmits the movement to the shaft 19, for the time being without being influenced by the pump system 25 with the output zero. Owing to the reaction of the resistance to motion of the vehicle at this transmission of energy, there is produced through the planet rim and the pump system 21, in the pressure pipe 23 of the latter and in the branch pipe 51, a pressure $p$ which (Fig. 5) pushes the piston 48 in the cylinder 49 against the pressure of the spring 50 through an amount $r$ and consequently rocks the bell crank lever 43 through its pin 46 about the pivot 42 into a position in which the arm 52 holds the slide block 54 in the guide 55 at a distance $f$ from the vertical.

Now, if in the present case the driving momentum, referred to the pins of the satellites 16, is equal to or greater than the momentum of the resistance to motion thereat, the planet rim will remain at rest and the power transmission to the shaft 19 will take place directly.

If, however, the momentum of the resistance to motion is greater—e. g., $x$ times as great—it will be necessary, as long as the engine output, and, consequently, the driving momentum are not increased, to insert a transmission ratio of $1:x$.

The reaction of the resistance to motion will first produce an hydraulic pressure $x.p$ in 23 and 51 through the planet rim and the first pump system. The piston 48 will consequently compress the spring 50 by a further amount, so that the point 46 will be shifted from the vertical by the amount $x.r$.

The rotation of the bell crank lever 43 about the pin 42 is effected from the point 46. If the angle which the arm 44 makes with the vertical is denoted by $w$, then the angle which the arm 52 makes with the vertical is equal to $(90-w)°$. Since the tangent of $(90-w)°$ is equal to $1:\tan w$, the arm 52 will shift back the slide block 54 towards the vertical through the amount $$\left(1-\frac{1}{x}\right).f,$$

so that it is only at a distance of $$\frac{1}{x}.f$$

therefrom. This movement is transmitted by the mechanisms shown in Figs. 6 and 7 from the lever 57 to the block 62 and from the latter to the rod 76 through 62, 70, 71 and 73, so that (Fig. 5) the end point 40 of the lever 31 is pushed into the position c through such an amount that there remains only the portion $$\frac{1}{x} \cdot s$$

of the original adjustment of the rate of output $s$ of the first pump system 21. At the same time an output in proportion to this regulation is adjusted through the lever 77 and the rod 80 in the second pump system 25, which output must be proportional to $$1 - \frac{1}{x}$$

as shown by the following consideration.

If the moment of the resistance to motion is $x$ times as great ($x$ is always greater than 1) as the driving momentum in the case of the just adjusted engine output, a transmission ratio of $1:x$ must be inserted because otherwise the driving engine would come to a standstill.

If the number of revolutions per minute of the shaft 19 when the planet rim is at rest is denoted by $n$, an arrangement must be provided in order that it will now receive the number of revolutions per minute of $$\frac{1}{x} \cdot n.$$

This will be the case when the planet rim and, with it, the first pump system slip back with a velocity which is $$\left(1-\frac{1}{x}\right) \cdot v,$$

$v$ being the circumferential speed of the sun wheel. The delivery volume of the pump system 25 with the number of revolutions per minute of $$\frac{1}{x} \cdot n$$

must now be so adjusted that it is $$\left(1-\frac{1}{x}\right) : \frac{1}{x}$$

i. e., $x-1$ times as great as the momentary delivery volume of the pump system 25. On the regulation the delivery volume V of 21 is, as has already been shown, at the transmission ratio of $1:x$ reduced to $$\frac{1}{x}$$

of the original delivery volume V. The delivery volume of 21 must therefore be ($x-1$ times $$\frac{1}{x} \text{ of } V$$

i. e., $$\left(1-\frac{1}{x}\right) \cdot V,$$

which is really obtained by means of the transmission through 76.

The transmission of energy of the planet gear with the hydraulic gear 21 and 25 connected thereto takes place in the following manner:—

The part $$\frac{1}{x}$$

of the driving momentum is transmitted so to speak mechanically (the circumferential force on the pins of 16 remains equal to P as in the case of the transmission before insertion of the transmission ratio). The planet rim 17, when the pump system 21 slips back, drives with the force $$\left(1-\frac{1}{x}\right) \cdot P.$$

Since at the same time the delivery volume of 21 has been reduced to $$\frac{1}{x} \cdot V,$$

the pump system 21 will transmit a momentum which gives $$\left(1-\frac{1}{x}\right) \cdot P : \frac{1}{x} = (x-1) \cdot P$$

as additional circumferential force to the mechanically transmitted force P, so that the total circumferential force on the shaft 19 corresponds to $(x-1)P+P=x.P$ and the momentum $$x.P\left(\frac{n}{x}\right)$$

corresponds to the correct mechanical-hydraulic transmission ratio.

The arrangement is therefore characterized by the feature that, starting with the control lever, provision is mechanically made simultaneously for direct power transmission by the engine output and the adjustment of the hydraulic gear, an automatic correction of the mechanically adjusted transmission ratio of the hydraulic gear being, at the same time, effected, in dependence upon the hydraulic pressure, by reduction of the delivery volume of the first pump system and corresponding increase of the delivery volume of the second pump system. Both pump systems therefore have a variable rate of output.

If the second pump system 25 is mounted on the driving shaft 13 between the engine 12 and the planet gear 14 with the pump system 21 connected to 17, as shown in Fig. 2, a certain simplification of the construction is produced, because the sun wheel 15 and the second pump system 25 always have the same number of revolutions per minute.

In this case, the point 29 is shifted directly by the lever 38 through the rod 39 and effects an adjustment of the rate of output of 21, which is directly proportional to the adjusted engine output. In this way, there is also effected simultaneously the displacement of 46 through the amount $r$ from the vertical.

Owing to the reaction of the resistance to motion on the planet rim 17 and the pump system 21 connected thereto, an hydraulic pressure $p$ will occur in 23 and 51. As long as no insertion of a transmission ratio is necessary, the delivery volume of the pump system 25 remains at zero. Now, if, owing to the resistance to travel (because its torque is $x$ times as great as the moment of the driving engine referred to the pins of 16) an insertion of a transmission ratio of $1:x$ is necessary, the hydraulic pressure rises from $p$ to $x.p$ and this pressure is transmitted through 23 and 51 to the piston 48 and pushes it against the pressure of the spring 50 until this displacement is $x$ times as great as $r$. The lever 43 is rocked about 42 to such an extent that, with the arm 52, it displaces the block 54 in 55 by the amount $$\left(1-\frac{1}{x}\right) \cdot f$$

towards the vertical at the distance of $$\frac{1}{x} \cdot f$$

from the latter. By means of the lever 57, this displacement is transmitted to 62 in the guide 61 and from 62 through the parallelogram guide 65, 68, 69, and from 71 through 70, 73 to the rod 76, the end point 40 of which directly effects the adjustment of an output of the pump system 25 that is proportional to $$\left(1 - \frac{1}{x}\right) s.$$

Owing to the adjustment of this output in 25, the planet rim 17 begins to slip back with the circumferential velocity of $$\left(1 - \frac{1}{x}\right) v$$

where $v$ is the circumferential velocity of the sun wheel, the number of revolutions per minute of 19 being reduced from $$n \text{ to } \frac{1}{x} \cdot n.$$

If the circumferential force of the driving momentum of the engine (referred to the pins of 16) was equal to P before the adjustment of the transmission ratio, then owing to the reaction of the resistance to motion, an output is transmitted from 21 through 25, which output gives a circumferential force $(x-1).P$ in addition to the existing circumferential force P, which forces together therefore equal $x.P$. There is then transmitted to 19, since its number of revolutions per minute has fallen from $$b \text{ to } \frac{1}{x} \cdot n$$

a total output of $$(x.P) \cdot \frac{1}{x} \cdot n = P.n$$

so that the whole output has been transmitted.

From 19 the drive goes in the usual manner to the vehicle wheels through the reversing gear and the differential gear.

This arrangement therefore also provides the two pump systems 21 and 25 for a variable delivery volume, but 21 is only directly adjusted mechanically by the control rods whilst 25 is adjusted automatically by the regulating rods.

If the arrangement of the elements of the gear according to Fig. 2 is kept, there is produced a remarkable further development of the idea of the invention by alteration as, represented in Fig. 3 of the mode of operation of the hydraulic gear.

In the case of this arrangement, the pump system 21 that is connected to 17, has a constant, invariable delivery volume. Now in order to render running light possible, there must be adjusted in 25, when the control lever and control rods are in the middle position, such a delivery volume that the liquid delivered by 21 flows without resistance through 22, 23 and 24 to 25 and flows back again from the latter without resistance to 21. If this condition is fulfilled, then, on running light the planet rim 17 with the pump system 21 connected thereto can slip back with the velocity of the sun wheel (but in the opposite direction to the latter), the satellites 16 rotate about their pins which are mounted in 18, and 18 and 19 remain at rest.

If now the delivery volume of 25 is diminished by shifting the control lever 34 forward and shifting the rods from the point 33 through 82, bellcrank lever 83 and rods 37, 38 and 39, and, consequently, shifting the point 30, the pump system 21 must slow down its movement, because, with the smaller delivery volume of the pump system 25, the continuity is only obtained with a smaller rate of output of the pump system 21 and, since its delivery volume remains unchanged, with a smaller number of revolutions per minute of the pump system 21 and the planet rim 17 connected therewith. Owing to the fact that 17 now rotates more slowly than when running light, the satellites 16 begin to roll between 15 and 17 and the movement is transmitted through 18 to 19 (for forward travel). If, however, the hydraulic pressure in 23 and 51 is, for example, $x$ times as great as that corresponding to the adjusted engine output, it will be necessary to correct the adjustment $s$ of the diminution of the rate of output of 25 by $$\left(1 - \frac{1}{x}\right) s \text{ to } \frac{1}{x} \cdot s$$

thereof. This is again effected through the piston 48, pin 46, lever 43, slide block 54, rocking lever 57, and (see Figure 11) through pin 62, shackles 65, guide 64, link 68 and rod 70, which shifts the end point 76 of the lever 73 (Figure 3) to such an extent that the displacement $s$ effected from 39 through 76 is reduced by $$\left(1 - \frac{1}{x}\right) s \text{ to } \frac{1}{x} \cdot s.$$

The output of work of the pump system 21, that slips back under the influence of the reaction of the resistance to motion, is supplied through the pump system 25 to the shaft 13 and, on regulation being effected, an increase of the circumferential force at the pins of the satellites 16 from P to $x.P$, in accordance with the diminution of the number of revolutions per minute of the shaft 19 from $$n \text{ to } \frac{1}{x} \cdot n$$

will be produced.

With this arrangement, the pump system 21 thus receives an unchangeable delivery volume, whilst that of the pump system 25 is determined, on the one hand, by the mechanical adjustment (proportional to the adjusted engine output) and, on the other hand, by the automatic correction (in accordance with the necessary transmission ratio).

In addition to this simplification of the constructive formation, this arrangement has a further property. When running light, the pump system 25 must, to render this possible, have such a delivery volume that (with the numbers of revolutions per minute of the pump systems 21 and 25 given by the constructive details) it can take up the output of 21 without resistance. Now, if the magnitude of the delivery volume of 25 is so chosen that when running light, a fraction—e. g., ⅔ or ½ is adjusted in order to be sufficient for the foregoing condition, then, on further reduction thereof, forward running will be effected in accordance with the foregoing explanation.

If, however, the delivery volume of 25, starting from the running light position is increased (this is effected in the arrangement shown by shifting the control lever), the following conditions are produced:— The pump system 25 will deliver a larger quantity of liquid than before but the pump system 21 will have kept its delivery volume unaltered. Continuity requires that in order that 21 may take up the quantity of liquid delivered by 25, the former must rotate more rapidly than when running light and in the same direction— e. g., in the direction opposite to that of the sun wheel 15. Between the latter and the planet rim 17 connected to 21 there is now produced for the pins of the satellites 16 a circumferential velocity in the direction opposite to that of the sun wheel (also opposite to that which is adjusted on the reduction of the delivery volume of 25 and was used for forward running). This is now used for rearward running, so that a reversing gear is superfluous.

In order to have for this part also an automatic correction of the mechanically adjusted delivery volume from 39, the cylinder 49 (Fig. 8) is formed with two chambers, the piston 48 is supported in one chamber against the spring 83 and a branch pipe 84 is laid from 27 to the second chamber of the cylinder. The rods of the controlling device are so constructed that they can follow the shifting of the hand lever 34 backwards (Fig. 9). The slot of 57 is extended beyond 58, the guide 61 is shifted from 59 and 60 beyond the dead centre 58, and the parallelogram guide 65, 68, 69 (Figure 11) is allowed to spring beyond the limiting position 58—66. The movement relationships of 54 in 55, from which the adjustment of the automatic correction of $s$ is derived, remain maintained even when 42 is shifted to below the middle position (Fig. 8).

The adjusting rods which are connected to the control lever may naturally be otherwise constructed. It is only essential that the hydraulic pressure, that occurs for a definite engine output with unregulated transmission, effects in the adjusting rods the adjustment of the arm of an angle in relation to the middle position, which angle includes the complementary angle in relation to a second axis, so that, with the transmission ratio of $l:x$, this arm cuts off the length $$\frac{1}{x}f$$

on the guide instead of the length $f$ without any transmission.

In Fig. 10 the lever 38 which is rotatably mounted at 41, is shifted by the rods 34, 35, 36 and 37, in the manner hereinbefore described (Fig. 1), in the same direction for forward and backward running. From the point 85 of the lever 38, the guide 55 is shifted parallel to itself through a straightly guided rod 86 in accordance with the engine output at the time being. The slide block 54 sliding in 55 is shifted by the, in this arrangement, single-armed straight lever 43 which is mounted at this fixed point, the lever 43 being rocked about 42 by the pin 46 of the piston rod 47 in accordance with the distance which the piston 48 traverses in opposition to the spring 50 under the pressure of the liquid supplied to the cylinder 49 from 23 through 51 or from 27 through 84. From 54 the lever 57 is again rocked about 58.

From the point 33 of the hand lever is derived through 82 and bell-crank lever 83 (Fig. 3) the displacement of the guide 61 such that the latter, in the middle position (idling position) of the control rods, coincides with the fulcrum 58 of the lever 57. The lever then shifts the block 62 in the guide 61 in accordance with the position of 54 in 55. The shifting of the point 30, that is determinative for the rate of output of 25, is effected at the point 71 through a straightly guided rod 70, bell-crank lever 73 and rod 76, by a parallelogram guide whose points of support 66 and 67 lie in the axis 42—58 and whose shackle 65 engages the block 62 with the slot 64 (Figure 11).

With the presumed linear admission of the engine, there always corresponds to the individual engine outputs the same cut-off portion $f$ which the lever 43 fixes by means of the block 54 on the guide 55 as long as no insertion of a transmission ratio is necessary.

Now if, with a definite position of the control rods, with which position a definite engine capacity is associated, the insertion of a transmission ratio $l:x$ is necessary, the pressure of the liquid in 23 or 27 rises from $p$ to $x.p$ and the portion cut off by 43 on the axis of 49 is $x$ times as great. The lever 43 then makes with the middle position an angle $w$, whose tangent is $x$ times as great as before the insertion of the transmission ratio. The portion cut off by 43 on 55, which was $f$, is now, after insertion of the transmission ratio, $$\frac{1}{x}\cdot f$$

because $f$ depends on the cotangent of the angle $w$. The point 54 has thus been shifted through $$\left(1-\frac{1}{x}\right)f$$

so that it is at a distance of $$\frac{1}{x}\cdot f$$

from the limiting position.

This relationship is transmitted, through the lever 57 to the guide 61 that is parallel to 55, by the block 62 being shifted in 61. The movement of 62 is transmitted through the parallelogram guide 65, 68, 69 (Fig. 11) directly to the point 30 through 71, 73 and 76. In this case, therefore, a separate adjustment from 30 through the control rods and 39 is dispensed with because the arrangement of 65 according to Fig. 11 includes this adjustment in itself.

In order to obtain compensating action on passing through curves without a differential gear being necessary, a separate planet gear with an hydraulic gear for variable transmission connected thereto is arranged for each driven wheel (Fig. 4), the adjusting rods being composed of the elements according to Figs. 10 and 11.

The automatic adjustment of the transmission ratio of the hydraulic gear in dependence upon the resistance to motion may naturally be employed for purely hydraulic transmission if a pump is driven by the engine, to which pump are hydraulically connected hydraulic motors, which are directly coupled with the driving wheels of the vehicle.

It is fundamentally immaterial whether the alteration of the output is obtained by actual alteration of the delivery volume of the pump systems or whether it is obtained in a known manner by means of flap valves, rotary slide valves etc. by short circuiting a definite portion of the delivered quantity of liquid with the one or other system.

The shifting, represented in the foregoing examples, by a straight-lined push by means of a lever, may, in the case of other pump systems, whose output is varied by, for example, rotation, be effected by means of other regulating members (eccentrics etc.). The regulating members must, however, again receive a firm mechanical adjustment in dependence upon the adjusted engine output and a second automatic adjustment in dependence upon the ratio of the momentum of the resistance to motion to the momentum of the driving engine. It is also possible for the case of engines, whose characteristic differs from the straight line, to adapt the arrangement of the control rods to the engine characteristic by choice of crossed rods, if required in conjunction with a spring 50 or combination of springs which maintains a curved characteristic.

The following advances are obtained by the above solutions:—

The hydraulic transmission of power is economically combined with the mechanical transmission.

In the given arrangements, there are no parts that are to be engaged with and disengaged from each other, so that the rapid wear, that is unavoidable in the case of such constructional parts, is obviated.

Attention to the clutch and its maintenance, as well as to the energy-consuming differential gear, are dispensed with.

The driver of the vehicle can devote the whole of his attention to the operation of the steering wheel. All the problems, which are connected with attention to the drive, are combined in the operation of the control lever, and the insertion of speeds on starting and on changes in the nature of the road is dispensed with.

The engine may be so proportioned that the maximum output and the maximum velocity of the vehicle is obtained within the zone of the most favourable efficiency of the engine, whereas at the present time the most favourable efficiency, having regard to the smallest necessary transmission ratio, lies at a fraction of the maximum velocity and this maximum velocity is only obtained when the engine works uneconomically. Owing to the always correct transmission ratio, which is adjusted without the intervention of the driver, the running of such a vehicle is substantially more economical.

It is always possible on forward running of the vehicle, even on running downhill, to set it to backward running, and, consequently, to obtain by means of the working engine, a finely adjustable, elastic and efficient braking without suffering a shock or exposing brake parts even to gradual wear.

What we claim is:—

1. A driving mechanism having a control lever and in which a planet gear having a loose rim is provided for transmitting motion from the driving shaft of the driving engine to the driven shaft, comprising a first pump system connected to the loose rim of said planet gear, a second pump system having a variable delivery volume, communicating with said first pump system and adapted to act as an hydraulic motor on said driven shaft, regulating rods adapted to be shifted by the control lever of said driving mechanism and on being shifted to adjust the hydraulic gear for variable transmission formed by said first and second pump systems, automatic shifting means for automatically shifting said regulating rods under the influence of the hydraulic pressure in said hydraulic gear, a slotted member operatively connected to said automatic shifting means and carrying a fulcrum of one of said rods, a second slotted member connected to said rods, a fixed guide, and a common slide block engaging the said guide and the said slotted members.

2. A driving mechanism having a control lever and in which a planet gear having a loose rim is provided for transmitting motion from the driving shaft of the driving engine to the driven shaft, comprising a first pump system connected to the loose rim of said planet gear, a second pump system having a variable delivery volume, communicating with said first pump system and adapted to act as an hydraulic motor on said driven shaft and also adapted to act on the driving shaft of the driving engine between said engine and said planet gear, regulating rods adapted to be shifted by the control lever of said driving mechanism and, on being shifted, to adjust the hydraulic gear for variable transmission formed by said first and said second pump systems, automatic shifting means for automatically shifting said regulating rods under the influence of the hydraulic pressure in said hydraulic gear, both said pump systems being adapted to have their delivery volume zero when the control rods for adjusting the engine output are in the idling position, means for enabling the said control rods, on adjusting an engine output, to adjust a delivery volume of said first pump system and means for enabling said automatic shifting means to alter the last mentioned adjustment and, at the same time, to adjust a delivery volume in said second pump system.

3. A driving mechanism having a control lever and in which a planet gear having a loose rim is provided for transmitting motion from the driving shaft of the driving engine to the driven shaft, comprising a first pump system connected to the loose rim of said planet gear, a second pump system having a variable delivery volume, communicating with said first pump system and adapted to act as an hydraulic motor on said driven shaft and also adapted to act on the driving shaft of the driving engine between said engine and said planet gear, regulating rods adapted to be shifted by the control lever of said driving mechanism and, on being shifted, to adjust the hydraulic gear for variable transmission formed by said first and said second pump systems, automatic shifting means for automatically shifting said regulating rods under the influence of the hydraulic pressure in said hydraulic gear, both said pump systems being adapted to have their delivery volume zero when the control rods for adjusting the engine output are in the idling position, means for adjusting a delivery volume in said first pump system on the adjustment of an engine output from said control rods, and means for enabling said automatic shifting means to adjust the delivery volume of said second pump system.

4. A driving mechanism having a control lever and in which a planet gear having a loose rim is provided for transmitting motion from the driving shaft of the driving engine to the driven shaft, comprising a first pump system connected to the loose rim of said planet gear and having a definite unchangeable delivery volume, a second pump system having a variable delivery volume, communicating with said first pump system and adapted to act as an hydraulic motor on said driven shaft, regulating rods adapted to be shifted by the control lever of said driving mechanism and, on being shifted, to adjust the hydraulic gear for variable transmission formed by said first and second pump systems, automatic shifting means for automatically shifting said regulating rods under the influence of the hydraulic pressure in said hydraulic gear, means for adjusting the delivery volume of said second pump system to the same rate of output as said first pump system, means for enabling said rate of output to be adjusted by the said rods and means connecting said automatic shifting means to said rods for correction of said rate of output in accordance with the ratio of the resistance to motion to the engine output.

5. A driving mechanism for motor vehicles, comprising for each vehicle wheel to be driven, a planet gear for transmitting motion from the driving shaft of the driving engine to the driven shaft, said planet gear having a loose rim, a first pump system connected to the loose rim of each of said planet gears, a second pump system having a variable delivery volume, communicating with said first pump system and adapted to act as an hydraulic motor on said driven shaft, a control lever for said driving mechanism regulating rods adapted to be shifted by the said control lever and, on being shifted, to adjust the hydraulic gear for variable transmission formed by said first and second pump systems and automatic shifting means for automatically shifting said regulating rods under the influence of the hydraulic pressure in said hydraulic gear.

6. A driving mechanism having a control lever and, in which a planet gear having a loose rim is provided for transmitting motion from the driving shaft of the driving engine to the driven shaft, comprising a first pump system connected to the loose rim of said planet gear, a second pump system having a variable delivery volume, communicating with said first pump system and adapted to act as an hydraulic motor on said driven shaft, regulating rods adapted, on being shifted, to adjust the hydraulic gear for variable transmission formed by said first and second pump systems, control rods coupled with the control lever that adjusts the supply of fuel to the engine, said control rods being adapted to shift said regulating rods, and automatic shifting means for automatically shifting said regulating rods under the influence of the hydraulic pressure in said hydraulic gear.

7. A driving mechanism according to claim 1, wherein said automatic shifting means comprises a cylinder connected to said hydraulic gear, a piston within said cylinder, spring means for loading said piston, and mechanism adapted to be shifted by the piston rod of said piston and to transmit the distance of shift of said piston, on said piston being moved in opposition to said spring means by the hydraulic pressure in said hydraulic gear, for the purpose of shifting said regulating rods, and wherein said regulating rods essentially comprise a lever and a guide, and said mechanism also comprises means for enabling the adjustment of the fulcrum of said lever in relation to said guide to be effected in dependence upon the output of the engine by the control rods for adjusting the engine output, said lever being adapted to be rocked about said fulcrum by the piston rod of said piston, a slide block adapted to be shifted in said guide by said lever on said lever being rocked, and lever rods adapted to transmit the distance of shift for the purpose of shifting said regulating rods.

8. A driving mechanism having a control lever and in which a planet gear having a loose rim is provided for transmitting motion from the driving shaft of the driving engine to the driven shaft, comprising a first pump system connected to the loose rim of said planet gear and having a definite unchangeable delivery volume, a second pump system having a variable delivery volume, communicating with said first pump system and adapted to act as an hydraulic motor on said driven shaft, regulating rods adapted to be shifted by the control lever of said driving mechanism and, on being shifted, to adjust the hydraulic gear for variable transmission formed by said first and second pump systems, automatic shifting means for automatically shifting said regulating rods under the influence of the hydraulic pressure in said hydraulic gear, means for adjusting a delivery volume in said first pump system on the adjustment of an engine output from the control rods for adjusting the engine output, means for giving said second pump system such a delivery volume that, when the driving engine is running light, said second pump system has the same rate of output as said first pump system, means for enabling said rate of output to be reduced by the control rods for adjusting the engine output when the vehicle is set for one direction of running and to be increased by said control rods when the vehicle is set for the opposite direction of running, and means for enabling said rate of output to be automatically corrected by said automatic shifting means through the said regulating rods in accordance with the ratio of the resistance to motion to the engine output.

9. A driving mechanism for motor vehicles, comprising, for each vehicle wheel to be driven, a planet gear for transmitting motion from the driving shaft of the driving engine to the driven shaft, said planet gear having a loose rim, a first pump system connected to the loose rim of each of said planet gears, a second pump system having a variable delivery volume, communicating with said first pump system and adapted to act as an hydraulic motor on said driven shaft and also adapted to act on the driving shaft of the driving engine between said engine and said planet gear, a control lever for said driving mechanism, regulating rods adapted to be shifted by the said control lever and, on being shifted, to adjust the hydraulic gear for variable transmission formed by said first and second pump systems, automatic shifting means for automatically shifting said regulating rods under the influence of the hydraulic pressure in said hydraulic gear, both said pump systems being adapted to have their delivery volume zero when the control rods for adjusting the engine output are in the idling position, means for enabling the control rods for adjusting the engine output, on adjusting an engine output, to adjust a delivery volume of said first pump system and means for enabling said automatic shifting means to alter the last mentioned adjustment and, at the same time, to adjust a delivery volume in said second pump system.

10. A driving mechanism having a control lever and in which a planet gear having a loose rim is provided for transmitting motion from the driving shaft of the driving engine to the driven shaft, comprising a first pump system connected to the loose rim of said planet gear, a second pump system having a variable delivery volume, communicating with said first pump system and adapted to act as an hydraulic motor on said driven shaft and also adapted to act on the driving shaft of the driving engine between said engine and said planet gear, regulating rods adapted on being shifted to adjust the hydraulic gear for variable transmission formed by said first part and second pump systems, control rods coupled with the control lever that adjusts the supply of fuel to the engine, said control rods being adapted to shift said regulating rods, automatic shifting means for automatically shifting said regulating rods under the influence of the hydraulic pressure in said hydraulic gear, both said pump systems being adapted to have their delivery volume zero when said control rods are in the idling position, means for enabling said control rods, on adjusting an engine output, to adjust a delivery volume of said first pump system and means for enabling said automatic shifting means to alter the last mentioned adjustment and, at the same time, to adjust a delivery volume in said second pump system.

11. A driving mechanism for motor vehicles, comprising for each vehicle wheel to be driven, a planet gear for transmitting motion from the driving shaft of the driving engine to the driven shaft, said planet gear having a loose rim, a first pump system connected to the loose rim of each of said planet gears, a second pump system having a variable delivery volume, communicating with said first pump system and adapted to act as an hydraulic motor on said driven shaft and also adapted to act on the driving shaft of the driving engine between said engine and said planet gear, a control lever for regulating rods adapted to be shifted by the said control lever and, on being shifted, to adjust the hydraulic gear for variable transmission formed by said first and second pump systems, automatic shifting means for automatically shifting said regulating rods under the influence of the hydraulic pressure in said hydraulic gear, means for adjusting a delivery volume in said first pump system on the adjustment of an engine output from the control rods for adjusting the engine output, and means for enabling said automatic shifting means to adjust the delivery volume of said second pump system.

12. A driving mechanism having a control lever and in which a planet gear having a loose rim is provided for transmitting motion from the driving shaft of the driving engine to the driven shaft, comprising a first pump system connected to the loose rim of said planet gear, a second pump system having a variable delivery volume, communicating with said first pump system and adapted to act as an hydraulic motor on said driven shaft, regulating rods adapted, on being shifted, to adjust the hydraulic gear for variable transmission formed by said first and second pump systems, control rods coupled with the control lever that adjusts the supply of fuel to the engine, said control rods being adapted to shift said regulating rods, automatic shifting means for automatically shifting said regulating rods under the influence of the hydraulic pressure in said hydraulic gear, means for adjusting a delivery volume in said first pump system on the adjustment of an engine output from the control rods for adjusting the engine output, and means for enabling said automatic shifting means to adjust the delivery volume of said second pump system.

BOHUSLAV KAČER.
MAX NOHEL.